United States Patent [19]

Bloomberg et al.

[11] Patent Number: 5,455,871
[45] Date of Patent: Oct. 3, 1995

[54] DETECTING FUNCTION WORDS WITHOUT CONVERTING A SCANNED DOCUMENT TO CHARACTER CODES

[75] Inventors: Dan S. Bloomberg, Palo Alto, Calif.; John W. Tukey, Princeton, N.J.; M. Margaret Withgott, Los Altos, Calif.

[73] Assignee: Xerox Corporation, Stamford, Conn.

[21] Appl. No.: 242,990

[22] Filed: May 16, 1994

Related U.S. Application Data

[63] Continuation of Ser. No. 794,190, Nov. 19, 1991, abandoned.

[51] Int. Cl.⁶ .................................................. G06K 9/34
[52] U.S. Cl. ........................ 382/173; 382/217; 382/258; 382/276
[58] Field of Search ........................ 382/9, 22, 7, 13, 382/14, 30, 55, 41

[56] References Cited

U.S. PATENT DOCUMENTS

| | | | |
|---|---|---|---|
| 2,905,927 | 9/1959 | Reed | 340/149 |
| 4,654,873 | 3/1987 | Fujisawa et al. | 382/9 |
| 4,773,098 | 9/1988 | Scott | 382/21 |
| 4,860,376 | 8/1989 | Tanka et al. | 382/9 |
| 4,918,740 | 4/1990 | Ross | 382/9 |
| 5,131,049 | 7/1992 | Bloomberg et al. | 382/55 |
| 5,144,682 | 9/1992 | Nakamura | 382/22 |
| 5,172,422 | 12/1992 | Tan | 382/9 |
| 5,181,255 | 1/1993 | Bloomberg | 382/55 |
| 5,197,107 | 3/1993 | Katsuyama et al. | 382/30 |
| 5,307,422 | 4/1994 | Wang | 382/9 |

OTHER PUBLICATIONS

"Introduction to Modern Information Retrieval" by Salton and McGill, Chapter 2, pp. 24–51 McGraw–Hill, Inc. (1983).

*Primary Examiner*—Leo H. Boudreau
*Assistant Examiner*—Phuoc Tran
*Attorney, Agent, or Firm*—Oliff & Berridge

[57] ABSTRACT

A method and apparatus detects function words in a first image of a scanned document without first converting the image to character codes. Function words include determiners, prepositions, articles, and other words that play a largely grammatical role, as opposed to words such as nouns and verbs that convey topic information. Non-content based morphological characteristics of image units are predetermined as well as the presence or omission of character ascenders and descenders in image units. Predetermined characteristics of function word image units are compared with the image units of an image and when a match occurs, the image unit is identified as a function word. Conversely when no matching characteristics occur, the image unit is identified as a non-function word. Additionally, image units are classified and identified as containing only upper case characters, only lower case characters, only digits, and mixed character types.

8 Claims, 6 Drawing Sheets

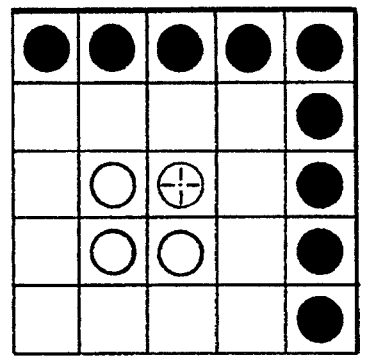
FIG. 3C-1
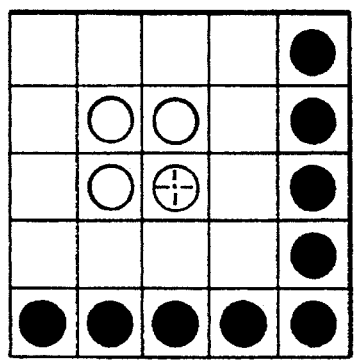
FIG. 3C-2
FIG. 3B-1
FIG. 3B-2
FIG. 3A-1
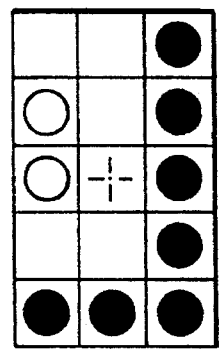
FIG. 3A-2
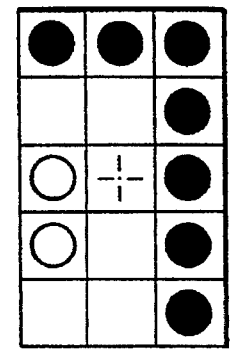

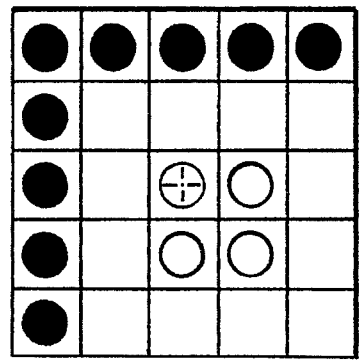
FIG. 4C-1
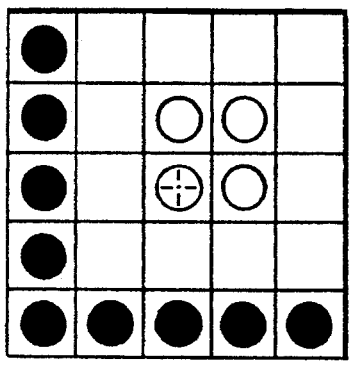
FIG. 4C-2
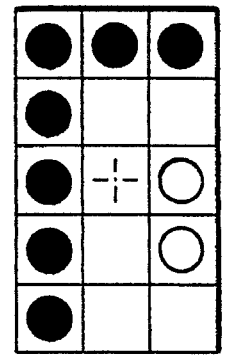
FIG. 4B-1
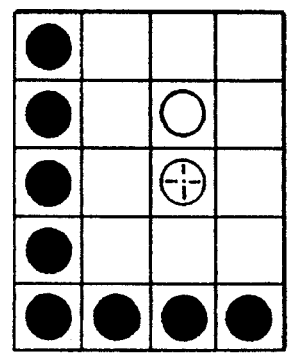
FIG. 4B-2
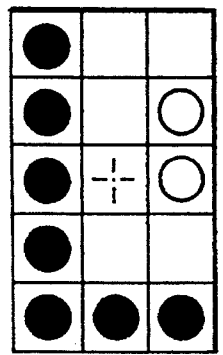
FIG. 4A-1
FIG. 4A-2

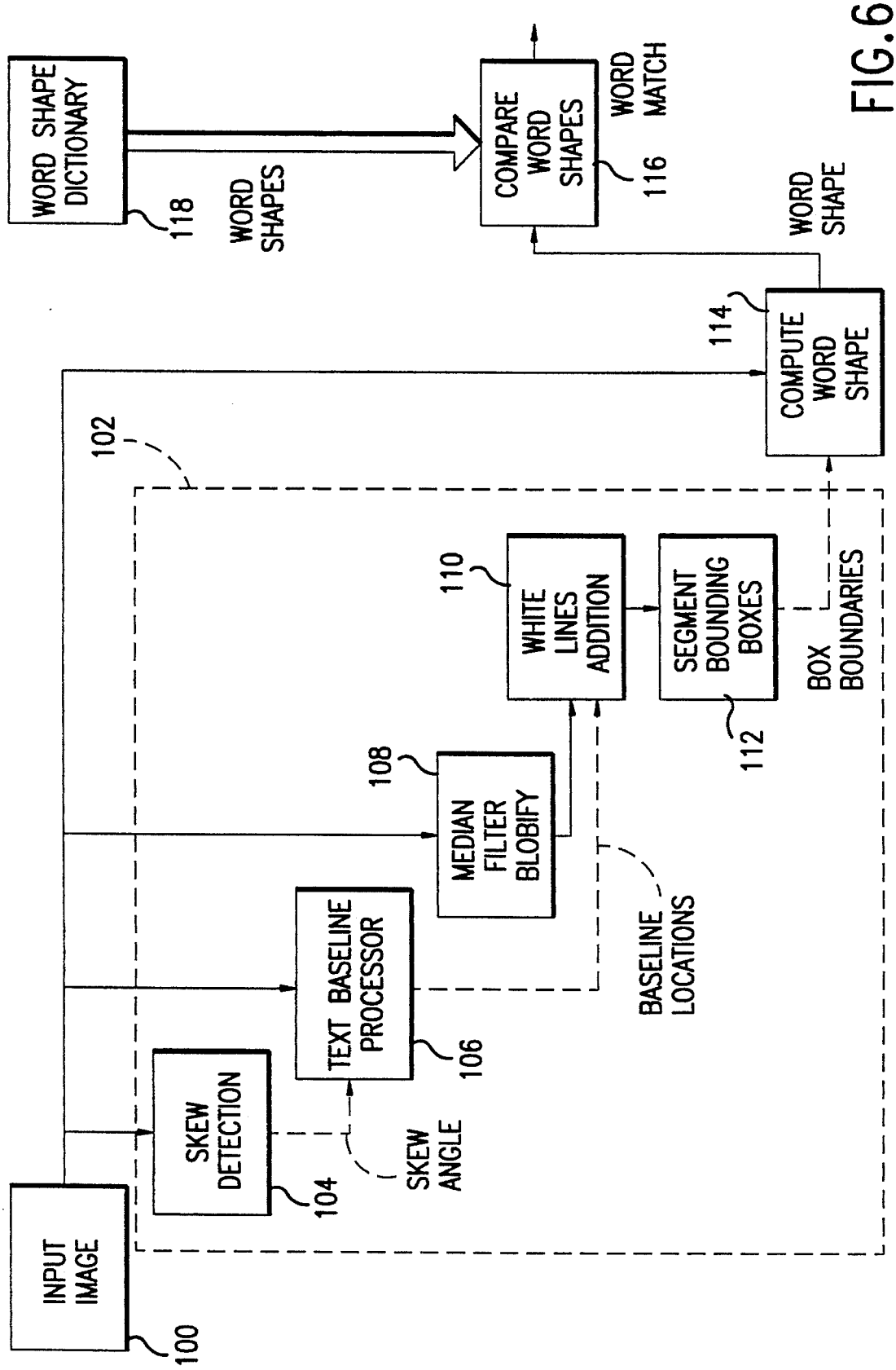

DETECTING FUNCTION WORDS WITHOUT CONVERTING A SCANNED DOCUMENT TO CHARACTER CODES

This is a continuation of application Ser. No. 07/794,190, filed Nov. 19, 1991, now abandoned.

BACKGROUND OF THE INVENTION

1. Cross References to Related Applications

The following concurrently filed U.S. patent applications are hereby cross-referenced and incorporated herein by reference in their entirety.

"Rapid Detection of Page Orientation", U.S. patent application Ser. No. 07/794,551 to Dasari et al., filed Nov. 19, 1991, now U.S. Pat. No. 5,276,742 issued Jan. 4, 1994.

"Method for Determining Boundaries of Words in Text", U.S. patent application Ser. No. 07/794,392 to Huttenlocher et al. filed Nov. 19, 1991, now U.S. Pat. No. 5,321,770 issued Jun. 14, 1994.

"A Method of Deriving Wordshapes for Subsequent Comparison", U.S. patent application Ser. No. 07/794,391 to Huttenlocher et al. filed Nov. 19, 1991.

2. Field of the Invention

This invention relates to improvements in methods and devices for scanned document image processing, and more particularly to improvements in methods and devices for detecting function words in a scanned document without first converting the scanned document to character codes.

3. Discussion of Related Art

A common problem in computer-based document processing is the separation of content words from function words for applications such as document retrieval and browsing. Function words include determiners, prepositions, particles, and other words that play a largely grammatical role, as opposed to words such as nouns and verbs that convey topic information. It is important to distinguish these categories for methods that rely on word frequency because while function words are the most frequently occurring lexical items in language, they modify, rather than determine, the contents of a document.

Typically, function words can be isolated using a stop-list, which is merely a list of predetermined function words. However, a problem with distinguishing function words surfaces in computer-based document processing applications that operate on image data (instead of on character code representations of text, e.g., ASCII). For instance, the length of a word itself is not determinative of function or non-function word status.

Reed U.S. Pat. No. 2,905,927 describes a method and apparatus for recognizing words where three scans are employed to determine the characteristics (i.e., pattern) of the word to be identified. An upper scan obtains information indicating the number and position of full-height symbols while a lower scan devises information indicative of symbols extending below the base line. A center scan acquires information relative to the number of symbols in the word and the symbol spacing.

SUMMARY OF THE INVENTION

It is thus an object of the invention to provide a method and apparatus for detecting function words in a scanned document image without first converting the document image, or any part thereof, to character codes.

It is a further object of the invention to provide a method and apparatus for rapid and cost effective detection of function words in a scanned document image using morphological image processing techniques.

It is another object of the invention to provide for the isolation of a large subclass of words, namely function words using non-content based image unit recognition. The morphological image processing used is efficient to alter images in an extremely fast and cost effective manner. For example, reduction of an image before processing is particularly effective in reducing computational time. Further, the claimed invention determines image units containing only upper case characters or only digits.

The invention thus examines image units without using optical character recognition and compares predetermined characteristics of the image units with known characteristics of function words. When a match of characteristics determinative of function word status occurs, the image unit is identified as a function word. Conversely when the proper matching characteristics do not occur, the image unit is identified as a non-function word. The invention includes the steps of: scanning an image of a page of a document; segmenting the image into image units; determining a length and height of each image unit; determining short image units as image units of three characters or less in length; deleting image units from the image that are not short image units; blurring the image units in a horizontal direction; taking a UNION of erosions of the image units using a set of ascender and descender matching structuring elements; seed filling the image units to provide short image unit masks filled for short image units with at least one ascender and short image unit masks filled for image units with at least one descender; and identifying function words as those image units which are filled short image unit masks. The invention also provides for the detection of word units that are all upper case or digit characters.

The scope of the present invention and the manner in which it addresses the problems associated with prior art methods will become more readily apparent from the following detailed description when taken in conjunction with the accompanying drawings and claims.

BRIEF DESCRIPTION OF THE DRAWINGS

The invention will be described in detail with reference to the following drawings in which like reference numerals refer to like elements and wherein:

FIGS. 3A-1–3C-2 show three sets of character ascender structuring elements where: FIGS. 3A-1 and 3A-2 show a set of character ascender structuring elements of height 3 and length 5 where FIG. 3A-1 shows a structuring element with ON pixels along the bottom row and along the rightmost column and one or more OFF pixels in a remaining location preferably separated from the ON pixels, and FIG. 3A-2 shows a structuring element with ON pixels along the bottom row and along the leftmost column and one or more OFF pixels in a remaining location preferably separated from the ON pixels,; FIGS. 3B-1 and 3B-2 show a set of character ascender structuring elements of height 4 and length 5 where FIG. 3B-1 shows a structuring element with ON pixels along the bottom row and along the rightmost column and one or more OFF pixels in a remaining location preferably separated from the ON pixels, and FIG. 3B-2 shows a structuring element with ON pixels along the bottom row and along the leftmost column and one or more OFF pixels in a remaining location preferably separated from the ON pixels; FIGS. 3C-1 and 3C-2 show a set of character ascender structuring elements of height 5 and length 5 where FIG. 3C-1 shows a structuring element with ON pixels along the bottom row and along the rightmost column and one or more OFF pixels in a remaining location preferably separated from the ON pixels, and FIG. 3C-2 shows a structuring element with ON pixels along the bottom row and along the leftmost column and one or more OFF pixels in a remaining location preferably separated from the ON pixels.

FIGS. 4A-1–4C-2 show three sets of character descender structuring elements where: FIGS. 4A-1 and 4A-2 show a set of character descender structuring elements of height 3 and length 5 where FIG. 4A-1 shows a structuring element with ON pixels along the top row and along the rightmost column and one or more OFF pixels in a remaining location preferably separated from the ON pixels, and FIG. 4A-2 shows a structuring element with ON pixels along the top row and along the leftmost column and one or more OFF pixels in a remaining location preferably separated from the ON pixels; FIGS. 4B-1 and 4B-2 show a set of character descender structuring elements of height 4 and length 5 where FIG. 4B-1 shows a structuring element with ON pixels along the top row and along the rightmost column and one or more OFF pixels in a remaining location preferably separated from the ON pixels, and FIG. 4B-2 shows a structuring element with ON pixels along the top row and along the leftmost column and one or more OFF pixels in a remaining location preferably separated from the ON pixels; and FIGS. 4C-1 and 4C-2 show a set of character descender structuring elements of height 5 and length 5 where FIG. 4C-1 shows a structuring element with ON pixels along the top row and along the rightmost column and one or more OFF pixels in a remaining location preferably separated from the ON pixels, and FIG. 4C-2 shows a structuring element with ON pixels along the top row and along the leftmost column and one or more OFF pixels in a remaining location preferably separated from the ON pixels;

FIG. 6 shows a block system diagram of the arrangement of system components forming a word shape recognition system.

DETAILED DESCRIPTION OF THE PREFERRED EMBODIMENT

Figure 1:
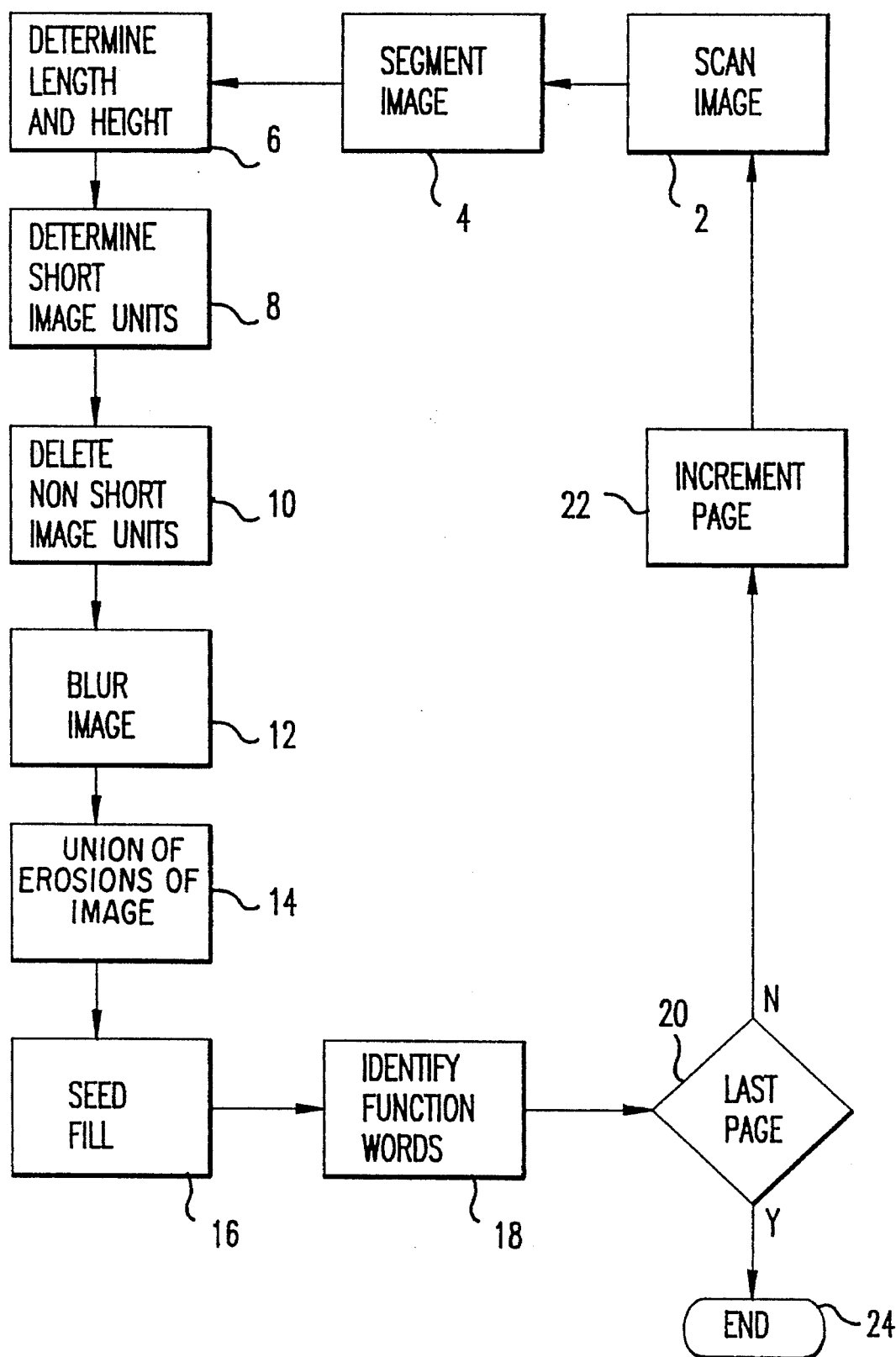
FIG. 1 is a flow chart of a preferred embodiment of a method according to the invention for detecting function words in a scanned document image without first converting the document image to character codes.

The following introductory material and definitions on morphological image processing will be recognized by one skilled in the art and helpful for a complete understanding of the invention as described in the specification and used in the claims.

The present discussion deals with binary images. In this context, the term "image" refers to a representation of a two-dimensional data structure composed of pixels. A binary image is an image where a given pixel is either "ON" of "OFF". Binary images are manipulated according to a number of operations wherein one or more source images are mapped onto a destination image. The results of such operations are generally referred to as images. The image that is the starting point of processing will sometimes be referred to as the original image or source image.

A "morphological operation" refers to an operation on a pixelmap image (a "source" image), that uses a local rule at each pixel to create another pixelmap image, the "destination" image. This rule depends both on the type of the desired operation to perform as well as on the chosen "structuring element".

Pixels are defined to be ON if they are black and OFF if they are white. It should be noted that the designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel.

A "structuring element" (SE) refers to an image object of typically (but not necessarily) small size and simple shape that probes the source image and extracts various types of information from it via the chosen morphological operation. In the attached figures that show SEs, a solid circle is a "hit" and an open circle is a "miss". The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A "solid" SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generally one column of ON pixels of selected size. A "hit-miss" SE refers to an SE that specifies at least one ON pixel and at least one OFF pixel.

AND, OR and XOR are logical operations carried out between two images on a pixel-by-pixel basis.

NOT is a logical operation carried out on a single image on a pixel-by-pixel basis.

"EXPANSION" is scale operation characterized by a scale factor N, wherein each pixel in a source image becomes an N×N square of pixels, all having the same value as the original pixel.

"REDUCTION" is a scale operation characterized by a scale factor N in a threshold level M. REDUCTION with scale=N entails dividing the source image into N×N squares of pixels, mapping each such square in the source image to a single pixel on the destination image. The value for the pixel in the destination image is determined by the threshold level M, which is a number between 1 and $N^2$. If the number of ON pixels in the pixel square is greater or equal to M, the destination pixel is ON, otherwise it is OFF.

"EROSION" is a morphological operation wherein a given pixel in the destination image is turned ON if and only if the result of superimposing the SE center on the corresponding pixel location in the source image results in a match between all ON and OFF pixels in the SE and the underlying pixels in the source image. An EROSION will give one pixel in the destination image for every match. That is, at each pixel, it outputs 1 if the SE (shifted and centered at that pixel) is totally contained inside the original image foreground, and outputs 0 otherwise. Note that EROSION usually refers to operations using a SE with only hits and more generally matching operations with both hits and misses (often called a "hit-miss transform"). The term EROSION is used herein to include matching operations with both hits and misses, thus the hit-miss transform is the particular type of EROSION used herein.

"DILATION" is a morphological operation wherein a given pixel in the source image being ON causes the SE to be written into the destination image with the SE center at the corresponding location in the destination image. The SEs used for DILATION typically have no OFF pixels. The DILATION draws the SE as a set of pixels in the destination image for each pixel in the source image. Thus, the output image is the union of all shifted versions of the SE translated at all 1-pixels of the original image.

"FillClip" is a morphological operation where one image is used as a seed and is grown morphologically, clipping it at each growth step to the second image. For example, a fillClip could include a DILATION followed by logically ANDing the DILATION result with another image.

"OPENING" is a morphological operation that uses an image and a structuring element and consists of an EROSION followed by a DILATION. The result is to replicate the structuring element in the destination image for each match in the source image.

"CLOSING" is a morphological operation using an image and a structuring element. It includes a DILATION followed by an EROSION of the image by a structuring element. A CLOSE of an image is equivalent to the bit inverse of an OPEN on the (bit inverse) background.

"UNION" is a bitwise OR between two images. An "intersection" is a bitwise AND between two images.

"Blurring" is a DILATION of an image by a structuring element(s) consisting of two or more hits.

A "mask" refers to an image, normally derived from an original or source image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

Morphological operations have several specific properties that simplify their use in the design of appropriate procedures. First, they are translationally invariant. A sideway shift of the image before transforming does not change the result, except to shift the result as well. Operations that are translationally invariant can be implemented with a high degree of parallelism, in that each point in the image is treated using the same rule. In addition, morphological operations satisfy two properties that make it easy to visualize their geometrical behavior. First, EROSION, DILATION, OPEN and CLOSE are "increasing", which means that if image 1 is contained in image 2, then any of these morphological operations on image 1 will also be contained in the morphological operation on image 2. Second, a CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the structuring element is located on a hit.

The OPEN and CLOSE operations also satisfy two more morphological properties:

(1). The result of the operation is independent of the position of the center of the structuring element.

(2) The operation is idempotent, which means that reapplying the OPEN or CLOSE to the resulting image will not change it.

An "image unit" means an identifiable segment of an image such as a word, number, character, glyph or other units that can be extracted reliably and have an underlying linguistic structure.

The term "significant" and its derivatives are used in this description to indicate the importance of particular characteristics of an image unit. An image unit with significant characteristics becomes a significant image unit in that it contains high value information which can be used for further processing of the document image. Significant characteristics of image units include a variety of classifiers such as length, width, location on a page of the document image, font, typeface and measurement by other parameters including, but not limited to:

one or more cross-sections of a box (a cross-section being a sequence of "ON" or "OFF" pixels);

a number of ascenders associated with an image unit;

a number of descenders associated with an image unit;

average pixel density in an image unit;

a length of a topline contour of an image unit, including peaks and troughs;

a length of a base contouring of the image units, including peaks and troughs; and the location of image units with respect to neighboring image units, e.g., vertical position and horizontal inter-image unit spacing.

FIG. 1 is a flow chart of a preferred embodiment of a method according to the invention for detecting function words in a scanned document image without first converting the document image to character codes. An image of a page of a document is scanned in step 2 and the image is segmented into image units in step 4. The segmentation can be accomplished, for instance, by using first a technique to determine baselines of image units as described in the above incorporated concurrently filed U.S. patent application Ser. No. 07/794,392 entitled "Method for Determining Boundaries of Words in Text" by Huttenlocher et al., and then second a technique for providing bounding boxes around image units as described in the above incorporated concurrently filed U.S. patent application Ser. No. 07/794,391 entitled "A Method of Deriving Wordshapes for Subsequent Comparison" by Huttenlocher et al.

The technique for providing bounding boxes around image units will be briefly described with reference to FIG. 6. More specifically, the above reference discloses a method for deriving, defining, and comparing words in terms of their shapes. It will, of course, be recognized that each element of the system may be many devices, or may simply be a program operated within a single device. Beginning with an input bitmap 100, a bitmap of an image is initially directed to a segmentation system 102, in which words, or character strings, or other multi-character units of understanding, will be derived. Initially, the image bitmap passes through skew detector 104, which determines the angle of orientation of text in the image. Using information about the orientation of the image, and the image itself, at text baseline processor 106, toplines and baselines of the text are determined, so that upper and lower boundaries of lines of text within the image are identified.

At median filter 108, the function referred to as "blobify" is performed, which operates on the image so that each word group in a line may be treated as a single unit. As used herein, "word", "symbol string" or "character string" refers to a set of connected alphanumeric or punctuation elements, or more broadly, signs or symbols which together form a single unit of semantic understanding. It will be appreciated that these terms may also be used to refer to the images thereof. Such single units of understanding are characterized in an image as separated by a spacing greater than that which separates the elements, signs or symbols forming the unit. To the blobified image, a set of white lines are added at block 110, to clearly separate adjacent lines of text. The white lines are based on baseline determinations provided by processor 106. Using this information, i.e., the blobified words, which are clearly separated from adjacent words and words in adjacent lines, a bounding box is defined about the word at block 112, thereby identifying and enclosing the word. The output of the segmentation system 102 is the segmented image units. A detailed example using this method along with other modifications of the method is disclosed in the U.S. patent application Ser. No. 07/794,391.

Figure 5:
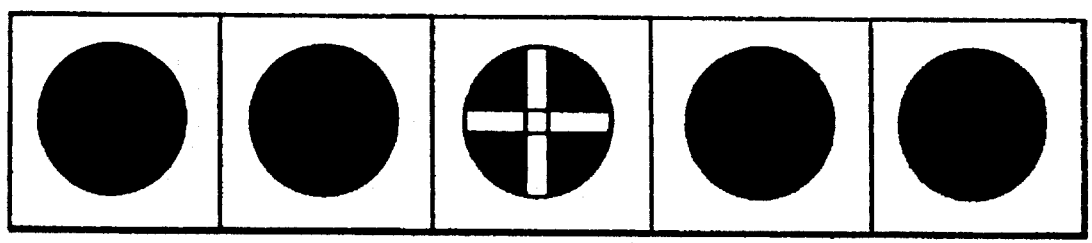
FIG. 5 shows a horizontal structuring element of length 5.

Referring to FIG. 1, a length and height of each image unit in the image is determined in step 6. Short image units are determined in step 8 as image units of no more than a predetermined number of characters, preferably three characters or less in length. Therefore, a short image unit has a predetermined maximum length. Any image units that are longer than the predetermined maximum length are considered long image units. In step 10, image units which are not short image units are deleted from the image. or smeared in a horizontal direction although the image units are not smeared together. This can be accomplished for example by CLOSING the image with a horizontal structuring element such as the structuring element of length 5 (i.e., 5 pixels) as shown in FIG. 5. The length of the horizontal structuring element used to blur the x-height characters in the image is dependent upon the width of the character type being used. Furthermore, other configurations of structuring elements may be used in the CLOSING operation to obtain the same smearing effect. However, the most efficient and effective way to smear characters of x-height is to use a horizontal structuring element as described above.

A UNION of erosions is taken in step 14 of the image using a set of ascender matching structuring elements such as those shown in FIGS. 3A-1, 3A-2, 3B-1, 3B-2, and 3C-1, 3C-2, and, a set of descender matching structuring elements such as those shown in FIGS. 4A, 4B and 4C. The UNION taken in step 14 provides optional noise elimination filtering, and the UNION will provide a seed from which to fill short image unit masks in a subsequent seed filling operation such as the fillClip operation of step 16. The UNION of step 14 acts on all image units remaining in the image (i.e., only short image units in this case) and since the UNION of erosions was taken using a set of ascender matching structuring elements and a set of descender matching structuring elements, the image units that will be filled are those containing ascender and/or descender characters, i.e., function words. The function words are identified in step 18 as those image units which are filled short image unit masks.

Image units consisting of all upper case letters and digits may be identified. Such image units are those remaining in the image after a result of the seed filling operation is subtracted from the image blurred in step 12.

In step 20 a test occurs to determine whether a last page of the document has been scanned. If the last page has been scanned, then the method terminates at step 24, otherwise the page is incremented in step 22 and the incremented (next) page is scanned in step 2 whereupon the image (next page) is scanned and the previously described steps of the method are reiterated. Of course, all pages could be scanned and stored as bit map images in a memory prior to performing the function word identification procedures described above. Moreover, the image segmentation step can also be performed prior to practicing the present invention (and the segmented image stored in memory) since segmentation has utility for procedures other than with the present invention.

Figure 2:
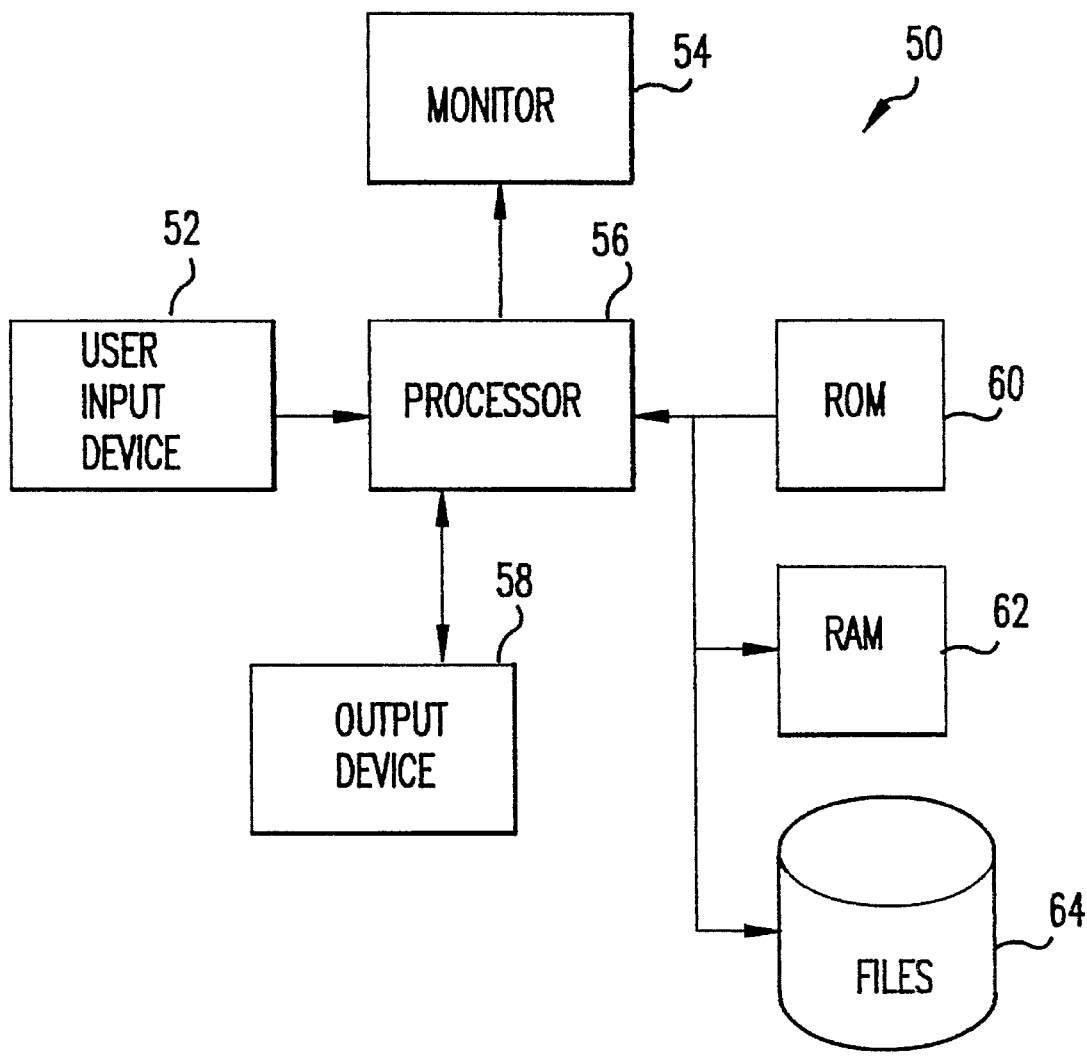
FIG. 2 is a block diagram of a preferred embodiment of an apparatus according to the invention for detecting function words in a scanned document image without first converting the document image to character codes.

FIG. 2 is a block diagram of a preferred embodiment according to the invention of an apparatus 50 for detecting function words in a scanned document image without first converting the document image to character codes. The apparatus 50 includes a user input device 52 which includes, for example, one or more of an image scanner (optical or electronic) a keyboard, a touchscreen, a mouse, etc. The image scanner can be a stand-alone device, or part of a facsimile machine or document reproducing machine (copier). A processor 56 is connected to the input device 52 for processing the document image to segment the document image into image units, determine a length and height of each image unit, determine short image units as image units of preferably three characters or less in length, delete image units from the image that are not short image units, blur the image in a horizontal direction, take an UNION of erosions of the image using a set of ascender and descender matching structuring elements, fillClipping the image to provide short image unit masks filled for short image units with at least one ascender and short image unit masks filled for short image units with at least one descender, and identifying function words as those image units which are filled short image unit masks. Processor 56 operates to perform these functions in accordance with operating programs read from read only memory (ROM) 60, and by using random access memory (RAM) 62. Documents can be stored or retrieved from files 64, and processing results and user input information can be monitored on a CRT display monitor 54. After processor 56 has completed processing the document image, the results can be output to an output device 58, which includes, for example, a storage means (hard or floppy disk), a printer, a photocopier, a facsimile machine or a CRT display.

While the present invention has been described with reference to particular preferred embodiments, the invention is not limited to the specific examples given, and other embodiments and modifications can be made by those skilled in the art without departing from the spirit and scope of the invention as defined in the following claims.

What is claimed is:

1. A method of processing an image of a scanned document, said document image having been previously scanned and segmented into image units, said method comprising the steps of:

(a) determining a length and height of each image unit;

(b) defining short image units as image units having a length no greater than a predetermined length;

(c) deleting image units from the image that are not said short image units, using the results of step (b);

(d) blurring the image in a horizontal direction to form a blurred image;

(e) eroding the blurred image using a set of ascender matching structuring elements and a set of descender matching structuring elements to form two eroded images;

(f) taking a UNION of the two eroded images;

(g) performing a seed filling operation using the image resulting from step (f) to provide 1) short image unit masks filled for short image units with at least one ascender, and 2) short image unit masks filled for short image units with at least one descender; and (h) identifying image units corresponding to said filled short image unit masks.

2. The method as recited in claim 1, wherein the step of blurring the image includes blurring the image by morphologically DILATING the image using at least one structuring element.

3. The method as recited in claim 1, wherein the step of blurring the image includes blurring the image by threshold reduction.

4. The method as recited in claim 1, further comprising the step of subtracting a result of the seed filling step from an input to the blurring step to identify image units which consist of all upper case letters and digits.

5. The method as recited in claim 1, wherein the seed filling step includes fillClipping the image.

6. An apparatus comprising:

an image scanning device for scanning a document image;

processor means for segmenting the image into image units, determining a length and height of each image unit, defining short image units as image units having a length no greater than a predetermined length, deleting image units from the image that are not defined as said short image units, blurring the image in a horizontal direction to form a blurred image, eroding the blurred image using a set of ascender matching structuring elements and a set of descender matching structuring elements to form two eroded images, taking a UNION of the two eroded images, performing a seed filling operation to provide 1) short image unit masks filled for short image units with at least one ascender, and 2) short image unit masks filled for short image units with at least one descender, and identifying image units corresponding to said filled short image unit masks; and an output device for outputting said identified image units.

7. A method of processing an image of a scanned document without converting the scanned document to character codes, said document image having been previously scanned and segmented into image units, said method comprising the steps of:

(a) determining a length and height of each image unit;

(b) defining short image units as image units of no greater than a predetermined length;

(c) deleting image units from the image that are not said short image units, using the results of step (b);

(d) blurring the image in a horizontal direction to form a blurred image;

(e) eroding the blurred image using a set of ascender matching structuring elements and a set of descender matching structuring elements to form two eroded images;

(f) taking a UNION of the two eroded images;

(g) performing a seed filling operation using the image resulting from step (f) to provide 1) short image unit masks filled for short image units with at least one ascender, and 2) short image unit masks filled for short image units with at least one descender; and (h) identifying image units corresponding to said filled short image unit masks.

8. The method as recited in claim 7, wherein the predetermined length is a length corresponding to a length of three characters.

* * * * *